Figure 1:
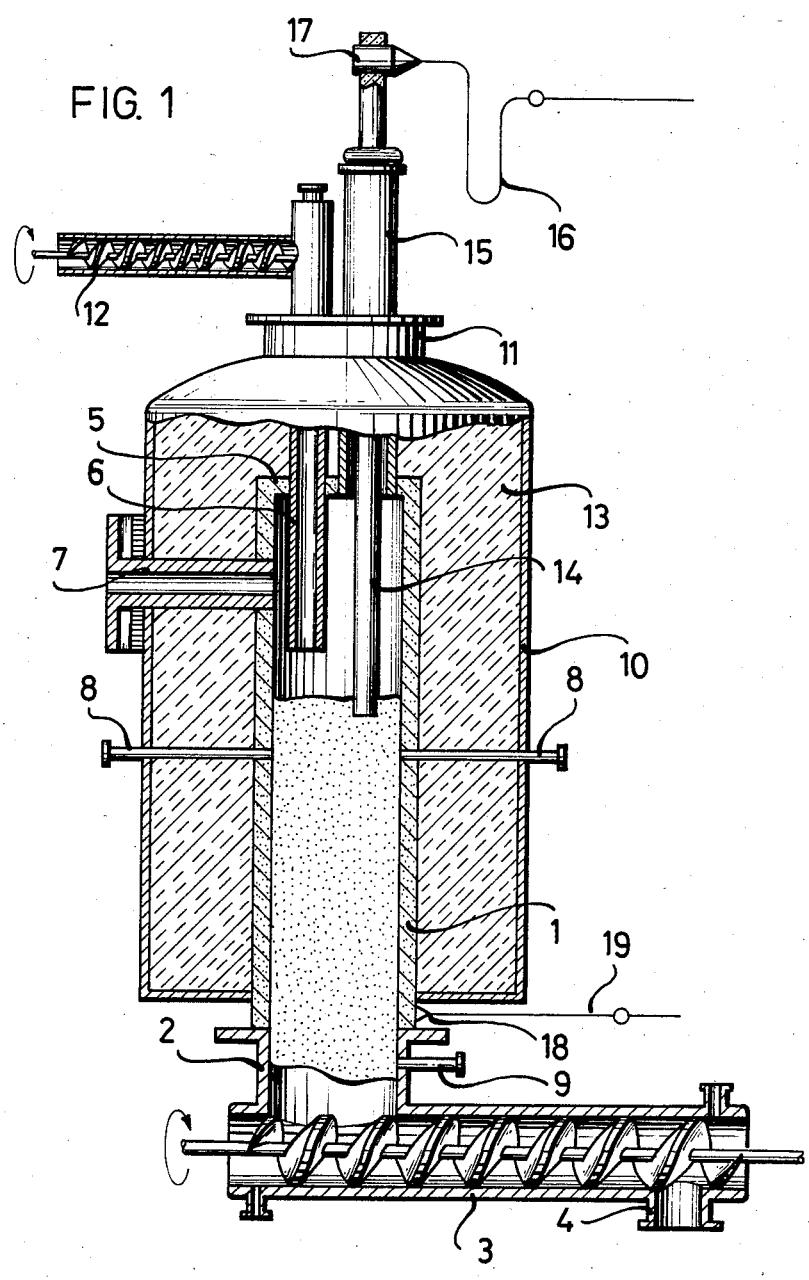

United States Patent [19]

Dorn et al.

[11] Patent Number: 4,601,887
[45] Date of Patent: Jul. 22, 1986

[54] APPARATUS FOR IMPROVING THE DEGREE OF GRAPHITIZATION OF CARBON BLACK, AND ITS USE

[75] Inventors: Friedrich-Wilhelm Dorn, Hürth-Hermülheim; Manfred Wolter, Hürth-Knapsack; Gero Heymer, Erftstadt, all of Fed. Rep. of Germany

[73] Assignee: Hoechst Aktiengesellschaft, Hurth Knapsack, Fed. Rep. of Germany

[21] Appl. No.: 428,947

[22] Filed: Sep. 30, 1982

Related U.S. Application Data

[60] Division of Ser. No. 269,676, Jun. 2, 1981, abandoned, which is a continuation of Ser. No. 87,052, Oct. 22, 1979, abandoned.

[30] Foreign Application Priority Data

Oct. 25, 1978 [DE] Fed. Rep. of Germany ....... 2846352

[51] Int. Cl.$^4$ .................. C01B 31/04; C09C 1/46; C09C 1/56
[52] U.S. Cl. ..................... 422/150; 373/111; 422/151; 423/448; 423/460
[58] Field of Search .......... 422/150, 151, 156, 158; 423/445, 448, 460, 461; 106/307; 204/173; 373/111, 112

[56] References Cited

U.S. PATENT DOCUMENTS

| | | | |
|---|---|---|---|
| 1,807,884 | 6/1931 | Wiegand | 423/445 |
| 2,021,991 | 11/1935 | Depew | 422/150 |
| 2,134,950 | 11/1938 | Offult | 423/448 |
| 2,949,344 | 8/1960 | Macura | 423/448 |
| 3,408,164 | 10/1968 | Johnson | 423/460 |
| 3,641,249 | 2/1972 | Higgins | 373/111 |
| 3,684,446 | 8/1972 | Markel | 423/461 |
| 3,933,434 | 1/1976 | Matovich | 373/112 X |
| 4,061,719 | 12/1977 | Schallus et al. | 423/445 |
| 4,160,813 | 7/1979 | Markel et al. | 423/448 |
| 4,208,373 | 6/1980 | Matovich | 422/150 X |
| 4,213,955 | 7/1980 | Casciani et al. | 423/442 |

Primary Examiner—Barry S. Richman
Assistant Examiner—Brion P. Heaney
Attorney, Agent, or Firm—Connolly and Hutz

[57] ABSTRACT

The invention relates to improving the degree of graphitization of carbon black produced by subjecting hydrocarbons which are liquid or gaseous under normal conditions to a thermal conversion reaction in the presence of oxygen or an oxygen-containing gas and steam, if desired, at temperatures of 1200° to 2000° C. and pressures of 1 to 80 bars. To this end, the carbon black is conveyed downwardly in a quasi-fluid state, within 1 to 5 hours through a sojourn zone in upright position, the sojourn zone being maintained at a temperature of at least 1200° C.

The invention relates to an apparatus for carrying out this process, the apparatus comprising a graphite tube; a steel container concentrically surrounding the graphite tube; a feed pipe penetrating into the interior of the graphite tube; a water-cooled discharge means; and a nitrogen feed inlet arranged below the lower end of the graphite tube; the space left between the graphite tube and steel container being occupied by insulating material.

1 Claim, 2 Drawing Figures

APPARATUS FOR IMPROVING THE DEGREE OF GRAPHITIZATION OF CARBON BLACK, AND ITS USE

CROSS REFERENCE

This application is a division of application Ser. No. 269,676, filed June 2, 1981 by Friedrich-Wilhelm Dorn et al for "Process for the Improving The Degree of Graphitization of Carbon Black, And Its Uses, now abandoned, which is a continuation of application Ser. No. 87,052, filed Oct. 22, 1979, now abandoned.

The present invention relates to improving the degree of graphitization of carbon black produced by subjecting hydrocarbons which are liquid or gaseous under normal conditions to thermal conversion in the presence of oxygen or an oxygen-containing gas and steam, if desired, at temperatures of 1200° to 2000° C. and pressures of 1 to 80 bars. The invention also relates to an apparatus for carrying out this process, and to the uses of the carbon black so graphitized.

Use can be made in the present process of carbon black with an AS-number higher than 15, such as that described in German Patent Specification "Offenlegungsschrift" No. 2,515,633. Use can also be made of carbon black with an AS-number within the range 13 to 20 produced by a process other than described above, i.e. by subjecting liquid or gaseous hydrocarbons to thermal cracking or partial combustion. The term "AS-number" (absorption stiffness) as used herein denotes that quantity of a water/acetone-mixture (mixing ratio=9:1) in cm$^3$, which is necessary to convert 5 g of carbon black into a single ball, in a round flask. The AS-number is used in the empirical evaluation of carbon black.

Adverse effects that are associated with the use of prior carbon black materials described heretofore reside in the fact that these materials partially lack satisfactory chemical inertness to oxidants in contact with which they undergo oxidation to $CO_2$ which is accompanied by partial decomposition of the oxidant.

The formation of a gaseous reaction product is more especially highly undesirable in all those cases in which carbon black and oxidant are accomodated in a closed space, i.e. used together with manganese dioxide as a depolarization material in dry batteries. In this event, it is possible for resulting $CO_2$ to effect an internal pressure build-up which is liable to cause deformation of the cell jacket and interruption of the electric contact. Whenever carbon black undergoes reaction with manganese dioxide, the reaction unvariably results in a reduction of the Mn(IV)-content of the dry cell and in the consequential reduction of its capacity, which manifests itself in a reduced discharge power.

It has been described that carbon black made by cracking acetylene at temperatures higher than 2300° C. (so-called acetylene-based carbon black) is substantially inert to oxidants, e.g. manganese dioxide. Acetylene-based carbon black has a crystal lattice with wide absolutely arbitrarily arranged graphite-structured areas. The mean thickness of these graphite-structured areas towards the crystallographic axes can be determined by known methods on the evidence of X-ray photographs. Thus the equation $$L_c = \frac{0.89 \cdot \lambda}{B \cdot \cos\Theta}$$

(in which $\lambda$ stands for the wave length of the monochromatic X-radiation, B stands for the width of half of maximum density of the reflex in the circular measure, and $\Theta$ denotes the position of the reflex maximum in degrees) enables the mean thickness of the graphite-structured areas in the direction of the c-axis to be determined from the [002]-reflex of a powder diffractogram. Calculation based on the above equation indicates a mean thickness of 60–70·$1^{-10}$ m for the graphite-structured area of acetylene-based carbon black. The mean thickness of the graphite-structured areas of carbon black is an index of its degree of graphitization, the chemical inertness of carbon black to oxidants, e.g. manganese dioxide, being the greater the higher the degree of graphitization.

It is therefore an oject of the present invention to provide means permitting carbon black to be rendered inert by producing large graphite-structured areas in its microstructure leaving its secondary structure substantially unimpaired. To this end, the invention provides for carbon black in a quasi-fluid state to be conveyed downwardly, within 1 to 5 hours, through a sojourn zone in upright position, the zone being maintained at a temperature of at least 1200° C.

Further preferred features of the present process provide:

(a) for the temperature in the sojourn zone to be maintained by flowing electric current through the carbon black;

(b) for the temperature in the sojourn zone to be maintained by admitting radiant heat thereto;

(c) for gaseous nitrogen to be introduced into the sojourn zone so as to flow countercurrently with respect to the carbon black therein;

(d) for gaseous chlorine and/or hydrogen chloride flowing countercurrently with respect to the carbon black to be additionally introduced into the sojourn zone;

(e) for a gaseous chlorine and/or a hydrogen chloride-yielding compound to be additionally introduced into the sojourn zone; and (f) for gaseous carbon tetrachloride, vinyl chloride or methyl chloride to be introduced into the sojourn zone.

It is an object of the present invention to provide an apparatus for carrying out the present process which comprises: a graphite tube; a steel container concentrically surrounding the graphite tube; insulating material occupying the space left between the graphite tube and steel container; a feed pipe penetrating into the interior of the graphite tube, the feed pipe having a dosing means secured to its upper end portion; an off-gas outlet penetrating into the upper portion of the graphite tube; a water-cooled discharged means connected to the lower end portion of the graphite tube; and a nitrogen feed inlet being arranged below the lower end of the graphite tube.

Preferred features of the present apparatus provide:

(g) for the graphite tube to be formed with at least one reaction gas feed pipe opening thereinto at a level lower than the off-gas outlet;

(h) for at least one vertically displaceable graphite electrode connected to a power supply line to be arranged so as to open into the interior of the graphite tube and for the latter to be connected to a further power supply line; and (i) for a device radiating heat and being connected to a current supply line to be arranged so as to open into the upper portion of the graphite tube.

In accordance with the present invention, use is made of the carbon black of improved degree of graphitization as depolarization material in dry batteries.

The present invention offers the following technically beneficial effects: The carbon black is caused continuously to travel through the sojourn zone and therefore not liable to cake together under the action of heat. In other words, its structure which so critically determines its absorptive power remains substantially unaffected, the graphitization occurring inside the individual carbon black particles. This in turn beneficially influences the stability of the carbon black's structure which is so important on mixing carbon black with other solid materials, e.g. manganese dioxide.

In addition to this, during the long period over which the carbon black is allowed to remain in the sojourn zone at high temperature, it is efficiently purified. During that period, oxygen-containing surface portions of the carbon black are destroyed and scarcely volatile, highly condensed aromatic and non-aromatic constituents are expelled. As a result, the carbon black treated in accordance with this invention, contains toluene-extractible matter (empyreumatic substances) in a proportion of less than 0.01%.

It has also been found that the method selected for maintaining the temperature inside the sojourn zone unexpectedly influences the degree of graphitization, at identical temperatures. In prior graphitization processes, the degree of graphitization has been described to depend exclusively on the temperature and period selected for the heat treatment. This is in clear contrast with the invention which produced the following results for the selection of identical residence times and temperatures: Carbon black heated inside the reactor by directly passing electrical power therethrough had a degree of graphitization higher than that of carbon black which was heated by means of radiant heat.

In order to produce carbon black containing a minimum, i.e. a few ppm (=parts per million) of metals or metal compounds, the present process provides for chlorine, hydrogen chloride or a chlorine or hydrogen chloride-yielding gas to be introduced into the sojourn zone, near its lower end portion. It is however also possible to mix the carbon black with a chlorine and/or hydrogen chloride-yielding substance and introduce the resulting mixture into the sojourn zone. In this case, it is good practice to fill the reactor to an extent of only 50 to 75% of its capacity, and introduce nitrogen into the free space left above the carbon black in the reactor. In this way, it is possible to free the carbon black from metallic impurities and limit its maximum chloride content substantially to 100 ppm.

Figure 2:
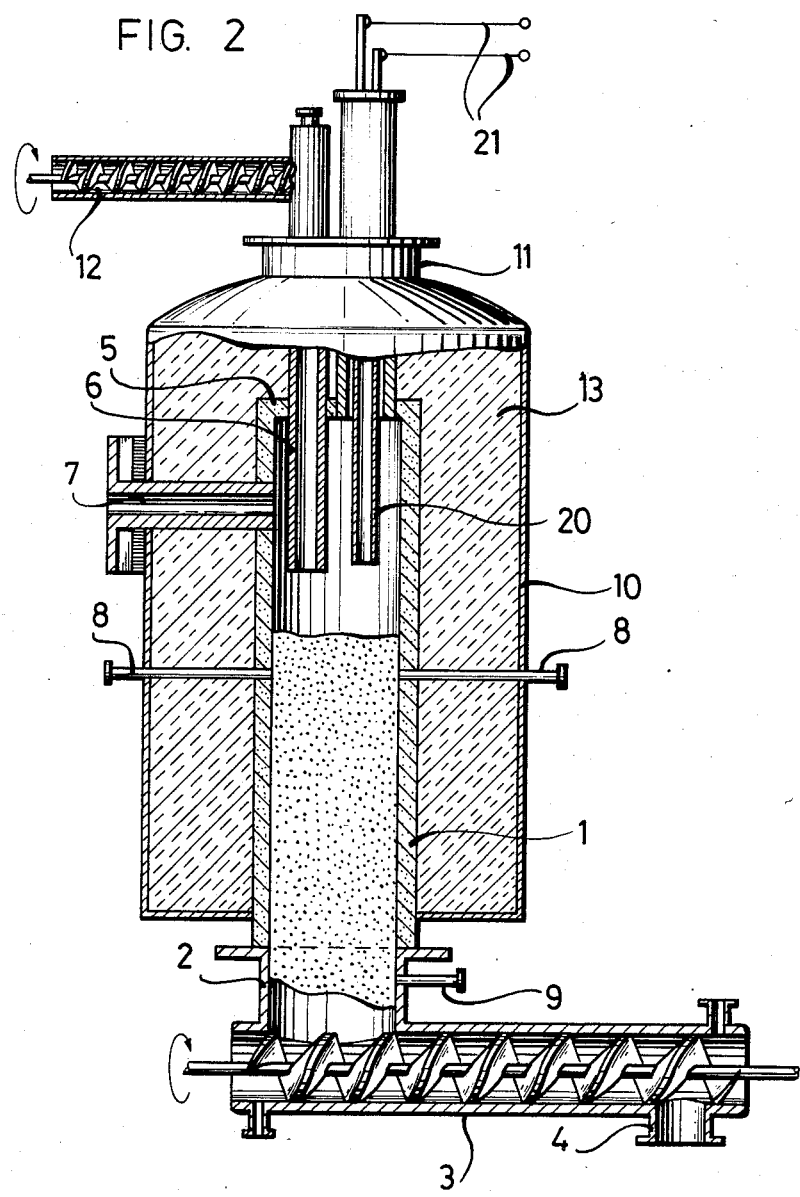

The apparatus used for carrying out the process of this invention will now be described with reference to the accompanying drawings showing the apparatus diagrammatically, partially in section, of which FIG. 1 shows an apparatus with means for flowing electrical power through the carbon black and FIG. 2 shows an apparatus provided with means radiating heat.

With reference to the drawings:

A cylindrical graphite tube 1 is mounted with its lower end on to the feed pipe 2 of a water-cooled screw conveyor 3 provided with an outlet 4 for the removal of carbon black with an improved degree of graphitization. The upper end of the graphite tube 1 is closed by means of a cover 5 which has a feed pipe 6 passed through it. Arranged in the upper portion of the graphite tube 1 so as to open into its interior is an off-gas outlet 7, and disposed in the central portion of the graphite tube 1 so as to open into its interior is a plurality of reaction gas feed pipes 8. A nitrogen inlet 9 is disposed so as to open into the feed pipe 2 forming part of the screw conveyor 3. Arranged concentrically with respect to the graphite tube 1 is a cylindrical steel vessel 10 of which the bottom portion has the graphite tube 1 passed through it, and of which the cover terminates in a socket 11. Passed through the socket 11 is a feed pipe 6 of which the upper end terminates in a horizontally arranged dosing screw feeder 12. The space left between the graphite tube 1 and the steel vessel 10 is packed with insulating material 13.

As shown in FIG. 1, the socket 11 also has a graphite electrode 14 passed through it which opens into the interior of the graphite tube 1 and which is partially surrounded concentrically, above socket 11, by a device 15 permitting the graphite electrode to be held and advanced. The graphite electrode 14 terminates with its upper end in a contact plate 17 provided with a flexible power supply line 16. Disposed near the lower end of the graphite tube 1 is a further contact plate 18 connected to a power supply line 19.

As shown in FIG. 2, a device radiating heat 20 is disposed in the upper portion of graphite tube 1, the device 20 being supported by the socket 11 and connected to power supply lines 21.

The feed material used in the following Examples 1 to 4 was carbon black, which was produced by subjecting gaseous hydrocarbons to a thermal conversion reaction as described in German Patent Specification "Offenlegungsschrift" No. 2 515 633. Prior to being used, it was heated to 650° C. so as to be freed from adhering hydrocarbons and moisture. It then had a residual moisture content of 0.5 weight%, an AS-number of 45–55, and a BET-surface area (cf. J. Amer. Chem. Soc. 60 (1938), page 309) of 1000 m$^2$/g. The mean thickness determined for its graphite structured areas was 25–30·10$^{-10}$ m.

EXAMPLE 1

Carbon black was introduced from above into a heat-insulated graphite vessel which had a diameter of 70 cm and was provided with a heat radiator, by means of a dosing means, and removed from the vessel's base portion by means of a water-cooled screw conveyor. 500 l/h of gaseous nitrogen was introduced from below into the vessel, countercurrently with respect to the carbon balck therein (FIG. 2). The quantities of carbon black admitted to, and taken from, the graphite vessel were selected so as to provide for a residence time of about 2 hours in the vessel and to ensure a throughput rate of about 10 kg/h. A temperature of 1800° C. was maintained inside the graphite vessel.

The carbon black taken from the vessel had an AS-number of 31 and a BET-surface area of 300 m$^2$/g. The mean thickness determined for its graphite-structured area was 70·10$^{-10}$ m.

EXAMPLE 2

Carbon black was introduced from above into a heat-insulated graphite vessel, which had a diameter of 70 cm and was provided with a vertically displaceable graphite electrode, by means of a dosing means, and was taken from the vessel's base portion by means of a water-cooled screw conveyor.

500 l/h of gaseous nitrogen was introduced into the graphite vessel from below, countercurrently with respect to the carbon black therein (cf. FIG. 1). The quantities of carbon black admitted to, and taken from, the graphite vessel were selected so as to provide for a residence time of about 1.5 hours in the vessel and ensure a throughput rate of about 10 kg/h. A temperature of 1500° C. was maintained inside the graphite vessel by appropriately regulating the heating current passed through the carbon black.

The carbon black obtained has an AS-number of 17.5 and a BET-surface area of 120 m$^2$/g. The mean thickness determined for its graphite-structured areas was $110 \cdot 10^{-10}$ m.

EXAMPLE 3

Carbon black was treated in the apparatus described in Example 2. The quantities of carbon black admitted to, and taken from, the graphite vessel were selected so as to provide for a residence time of about 3 hours in th vessel and ensure a throughput rate of about 10 kg/h. A temperature of 1800° C. was maintained inside the graphite vessel by appropriately regulating the heating current passed through the carbon black.

The carbon black obtained has an AS-number of 15 and a BET-surface area of 80 m$^2$/g. The mean thickness determined for its graphite-structured areas was $135 \cdot 10^{-10}$ m.

EXAMPLE 4

Carbon black was treated in the apparatus described in Example 2, save that some additional 500 l/h of hydrogen chloride gas was introduced, upstream of the nitrogen inlet, into the graphite vessel, counter-currently with respect to the carbon black therein. The quantities of carbon black admitted to, and taken from, the graphite vessel were selected so as to provide for a residence time of about 4 hours in the vessel and ensure a throughput rate of about 10 kg/h. A temperature of 1500° C. was maintained inside the graphite vessel by appropriately regulating the heating current passed through the carbon black.

The carbon black obtained has an AS-number of 18 and a BET-surface area of 145 m$^2$/g. The mean thickness determined for its graphite-structured areas was $105 \cdot 10^{-10}$ m. The carbon black contained less than 10 ppm of nickel, less than 50 ppm of iron and vanadium, respectively, and less than 100 ppm of chloride.

The carbon black used as feed material in the following Examples 5 and 6, which was obtained by subjecting carbon black oil to a thermal conversion reaction, had an AS-number of 12 to 15 and a BET-surface area of 85 m$^2$/g. The mean thickness determined for its graphite-structured areas was $50 \cdot 10^{-10}$ m.

EXAMPLE 5

Carbon black was treated in the apparatus described in Example 1. The quantities of carbon black admitted to, and taken from, the graphite vessel were selected so as to provide for a residence time of about 3 hours in the vessel and ensure a throughput rate of about 10 kg/h. 500 l/h of gaseous nitrogen was introduced into the vessel from below, countercurrently with respect to the carbon black therein. A temperature of 1800° C. was maintained inside the graphite vessel.

The carbon black obtained had an AS-number of 18 and a BET-surface area of 90 m$^2$/g. The mean thickness determined for its graphite-structured areas was $70 \cdot 10^{-10}$ m.

EXAMPLE 6

Carbon black was treated in the apparatus described in Example 2. The quantities of carbon black admitted to, and taken from, the graphite vessel were selected so as to provide for a residence time of about 3 hours in the vessel and ensure a throughput rate of about 10 kg/h. 500 l/h of gaseous nitrogen was introduced into the graphite vessel from below. A temperature of 1800° C. was maintained inside the vessel by appropriately regulating the heating current passed through the carbon black. The carbon black obtained had an AS-number of 17.5 and a BET-surface area of 90 m$^2$/g. The mean thickness determined for its graphite-structured areas was $90 \cdot 10^{-10}$ m.

The carbon black used as feed material in the following Examples 7 and 8, which was produced by subjecting tar oil to partial combustion, had an AS-number of 18.5 and a BET-surface area of 60 m$^2$/g. The mean thickness determined for its graphite-structured areas was $29 \cdot 10^{-10}$ m.

EXAMPLE 7

Carbon black was treated in the apparatus described in Example 1. The quantities of carbon black admitted to, and taken from, the graphite vessel were selected so as to provide for a residence time of about 3 hours in the vessel and ensure a throughput rate of about 10 kg/h. 500 l/h of gaseous nitrogen was introduced into the graphite vessel from below. A temperature of 1800° C. was maintained inside the vessel.

The carbon black obtained had an AS-number of 17 and a BET-surface area of 60 m$^2$/g. The mean thickness determined for its graphite-structured areas was $80 \cdot 10^{-10}$ m.

EXAMPLE 8

Carbon black was treated in the apparatus described in Example 2. The quantities of carbon black admitted to, and taken from, the graphite vessel were selected so as to provide for a residence time of about 3 hours in the vessel and ensure a throughput rate of about 10 kg/h. 500 l/h of gaseous nitrogen was introduced into the graphite vessel from below. A temperature of 1800° C. was maintained in the vessel by appropriately regulating the heating current passed through the carbon black.

The carbon black obtained had an AS-number of 18.5 and a BET-surface area of 60 m$^2$/g. The mean thickness determined for its graphite-structured areas was $110 \cdot 10^{-10}$ m.

The Examples show the unexpected effect which is produced by the direct passage of heating current through the carbon black placed in a graphite vessel and which compares favorably with the effect produced by means of radiant heat. More specifically, it is possible by the direct passage of current through carbon black at identical temperatures (cf. Examples 1 and 3, 5 and 6, and 7 and 8, respectively,) and even at lower temperatures (cf. Examples 1 and 2) to produce an improved mean thickness, i.e. to obtain carbon black with extended graphite-structured areas.

The carbon black with the improved properties produced by this invention was tested for its usefulness in dry batteries. To this end, it was subjected to battery tests in "paper-lined" zinc/manganese dioxide cells R 20 (I. E. C. Standard). The depolarization mass (cathode mass) consisted of 55 parts by weight of manganese dioxide, 14 parts by weight of ammonium chloride, 1 part by weight of zinc oxide, 5 parts by weight of water and 9 parts by weight of the carbon black grades produced in Examples 1 and 4 and, for the purpose of comparison, of acetylene-based carbon black; 16 parts by weight of a 30 weight% aqueous zinc chloride solution was used as the internal electrolyte.

6 cells were stored in each particular case for 5 to 7 days at room temperature (n) and for 30 days at 45° C. (T) and then discharged under the following conditions:
(1) Transistor discharge: 4 h/day across 45 ohm up to 0.9 volt;
(2) Tape recorder discharge: 2 h/day across 5 ohm up to 1.1 volt;
(3) Lift discharge: each time for 4 min/h at 8 cycles/day across 2.25 ohm up to 0.9 volt.

The short-circuit current was also determined.

In order qualitatively to evaluate the storability of the cells, they were inspected for their external appearance after storage at T, and the appearance was rated by points. More particularly, the visual deformation of the cell cover formed of an asphalt-containing sealing composition was assigned a certain score which was selected in accordance with the extent and seriousness of the respective deformation. An especially high score (poor condition) was assigned to a leaky cell and a low score was assigned to a cell which just showed blisters in the sealing composition. A score of 0 was accordingly assigned to an unchanged cell. The results obtained in the storability and discharge tests are indicated in the following Table. As can be seen, the carbon black of Example 4 (Invention; graphitization by direct passage of current and purification with hydrogen chloride gas) was found in the discharge test to be comparable with acetylene-based carbon black, and to even compare favorably with the latter in the storability test at 45° C. (T). This was a result of the improved degree of graphitization of the carbon black of the present invention and its reduced oxidizability by manganese dioxide.

TABLE

|  | Storage | Transistor discharge (h) | Lift discharge (min) | Tape recorder discharge (h) | Short-circuit current (amp) | Score assigned |
|---|---|---|---|---|---|---|
| Carbon black Ex. 1 (invention) | n | 156.0 | 291 | 10 | 9.9 | 0 |
|  | T | 187.3 | 227 | 7.6 | 6.9 | 329 |
| Carbon black Ex. 4 (invention) | n | 216.0 | 375 | 12.0 | 11.8 | 0 |
|  | T | 214.0 | 348 | 11.9 | 13.3 | 173 |
| Acetylene-based Carbon black | n | 195.5 | 403 | 14.0 | 9.1 | 0 |
|  | T | 191.5 | 385 | 14.8 | 8.9 | 195 |

We claim:
1. An apparatus for improving the degree of graphitization of carbon black obtained by thermal conversion of hydrocarbons which are liquid or gaseous under normal conditions (S.T.P.), the carbon black being subjected in a sojourn zone in vertical position at temperatures of at least 1200° C. to countercurrent treatment with chlorine and hydrogen chloride, respectively, and inert gas, the apparatus comprising a graphite tube in vertical position; a steel container concentrically surrounding and being spaced from the graphite tube, the resulting space between the graphite tube and the steel container containing insulating material; a carbon black feed conduit reaching into the graphite tube and terminating in its upper end portion; a graphite electrode reaching into the graphite tube for directly heating downwards flowing carbon black, said graphite electrode and graphite tube defining a sojourn zone, said graphite electrode being displaceable in vertical position in the sojourn zone, the graphite tube being the actual counter-electrode; feed pipes for the introduction of chlorine containing gas wherein said feed pipes open into the central portion of the graphite tube; an off-gas outlet penetrating into the upper portion of the graphite tube; a water-cooled discharge means having an inlet pipe and an outlet pipe, said inlet pipe, which is connected to the lower end of the graphite tube, is penetrated by a nitrogen feed pipe.

* * * * *